United States Patent
Barhudarian et al.

(10) Patent No.: US 11,171,948 B2
(45) Date of Patent: Nov. 9, 2021

(54) ADAPTIVE SESSION LIFETIME

(71) Applicant: Microsoft Technology Licensing, LLC, Redmond, WA (US)

(72) Inventors: Violet Anna Barhudarian, Kirkland, WA (US); George Adrian Drumea, Kirkland, WA (US); Pui-Yin Winfred Wong, Redmond, WA (US); Radhika Kashyap, Seattle, WA (US); Titus Constantin Miron, Seattle, WA (US); Caleb Baker, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 388 days.

(21) Appl. No.: 16/019,913

(22) Filed: Jun. 27, 2018

(65) Prior Publication Data
US 2020/0007535 A1    Jan. 2, 2020

(51) Int. Cl.
*H04L 29/06* (2006.01)
*H04L 29/08* (2006.01)

(52) U.S. Cl.
CPC ........ *H04L 63/0853* (2013.01); *H04L 63/108* (2013.01); *H04L 63/1433* (2013.01); *H04L 67/146* (2013.01)

(58) Field of Classification Search
CPC ............. H04L 63/0807; H04L 63/0853; H04L 63/108; H04L 63/1433; H04L 67/146
See application file for complete search history.

(56) References Cited

U.S. PATENT DOCUMENTS

| | | | |
|---|---|---|---|
| 9,923,927 B1* | 3/2018 | McClintock | .......... H04L 63/108 |
| 2007/0101418 A1 | 5/2007 | Wood et al. | |
| 2009/0199264 A1* | 8/2009 | Lang | ....................... G06F 21/57 |
| | | | 726/1 |
| 2014/0189807 A1* | 7/2014 | Cahill | ................. H04L 63/0861 |
| | | | 726/4 |
| 2015/0269566 A1* | 9/2015 | Gaddam | .............. G06Q 20/385 |
| | | | 705/67 |
| 2016/0080367 A1 | 3/2016 | Roth et al. | |
| 2018/0069867 A1 | 3/2018 | Grajek et al. | |

OTHER PUBLICATIONS

"International Search Report and Written Opinion Issued in PCT Application No. PCT/US2019/037132", dated Aug. 7, 2019, 10 Pages.
"Configurable Token Lifetimes in Azure Active Directory (Preview)", Retrieved From https://docs.microsoft.com/en-us/azure/active-directory/active-directory-configurable-token-lifetimes, Apr. 19, 2018, 18 Pages.

* cited by examiner

*Primary Examiner* — Theodore C Parsons
(74) *Attorney, Agent, or Firm* — Workman Nydegger

(57) ABSTRACT

Session lifetime can be adapted based on session reputation. Session reputation can be computed based on sign-in risk and device risk, among other things. Session lifetime corresponds to a length of time a session is valid and can be determined automatically based on the session reputation. Subsequently, a token can be generated and returned in response to successful authentication that identifies a session and is valid for the determined lifetime.

20 Claims, 8 Drawing Sheets

ADAPTIVE SESSION LIFETIME

BACKGROUND

Access to computer systems and data can be controlled in part by authentication. Authentication is a security mechanism that verifies the identity of an entity, such as a person or system. An entity can submit one or more authentication credentials together with an identity, wherein the one or more authentication credentials can include something the entity knows, has, is, or does. The entity can be authenticated or verified if the identity matches credentials stored by a computer system for which access is sought. For example, a user can provide a user name (e.g. identity) and password (e.g., credential) in conjunction with seeking access to a system or service, and if the password matches the user name associated with the system or service, the user is deemed authenticated.

A session identifier can be received by an entity after successful authentication. The session identifier can be sent with subsequent requests to a computer system to eliminate the need to reauthenticate for every request. Nevertheless, the session identifier can be stateful including a session lifetime. Session lifetime is a period of time the session is valid after which reauthentication is required. For example, an information technology (IT) administrator could set the session lifetime for a few minutes, hours, or days.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to adaptive session lifetime. A measure of session reputation can be determined or inferred automatically based on one or more factors including sign-in risk, device risk, and resource sensitivity, among other things. Session lifetime can subsequently be determined based on session reputation, such that a session with a risky reputation has a shorter lifetime than a session with a safe reputation. A token can be generated comprising a session identifier and a validity specified by the determined lifetime for use in establishing a session. Re-evaluation of session lifetime can be triggered or performed periodically such that session lifetime is responsive to changed conditions.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

A tension exists between security and usability with respect to session lifetimes. Short session lifetimes are more secure than long session lifetimes. However, short session lifetimes are less convenient than long session lifetimes because authentication credentials need to be entered more frequently than for a longer session lifetime. Session lifetime thus plays a significant role in balancing security and usability.

The subject description pertains to adaptive session lifetime. Rather than being fixed, session lifetime is variable and adaptive to different circumstances. More particularly, session lifetime can be determined and set as a function of session reputation for each authentication entity thereby allowing appropriate security without undue inconvenience. Session reputation can be computed automatically based on one or more factors including sign-in risk, device risk, sensitivity of data, and role, among others. Further, machine learning can enable such a determination to be performed automatically with increased intelligence and adaptiveness over time. Furthermore, session lifetime can be re-evaluated and modified or revoked based on changed conditions. Session lifetime can also be dependent upon behavioral analysis.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
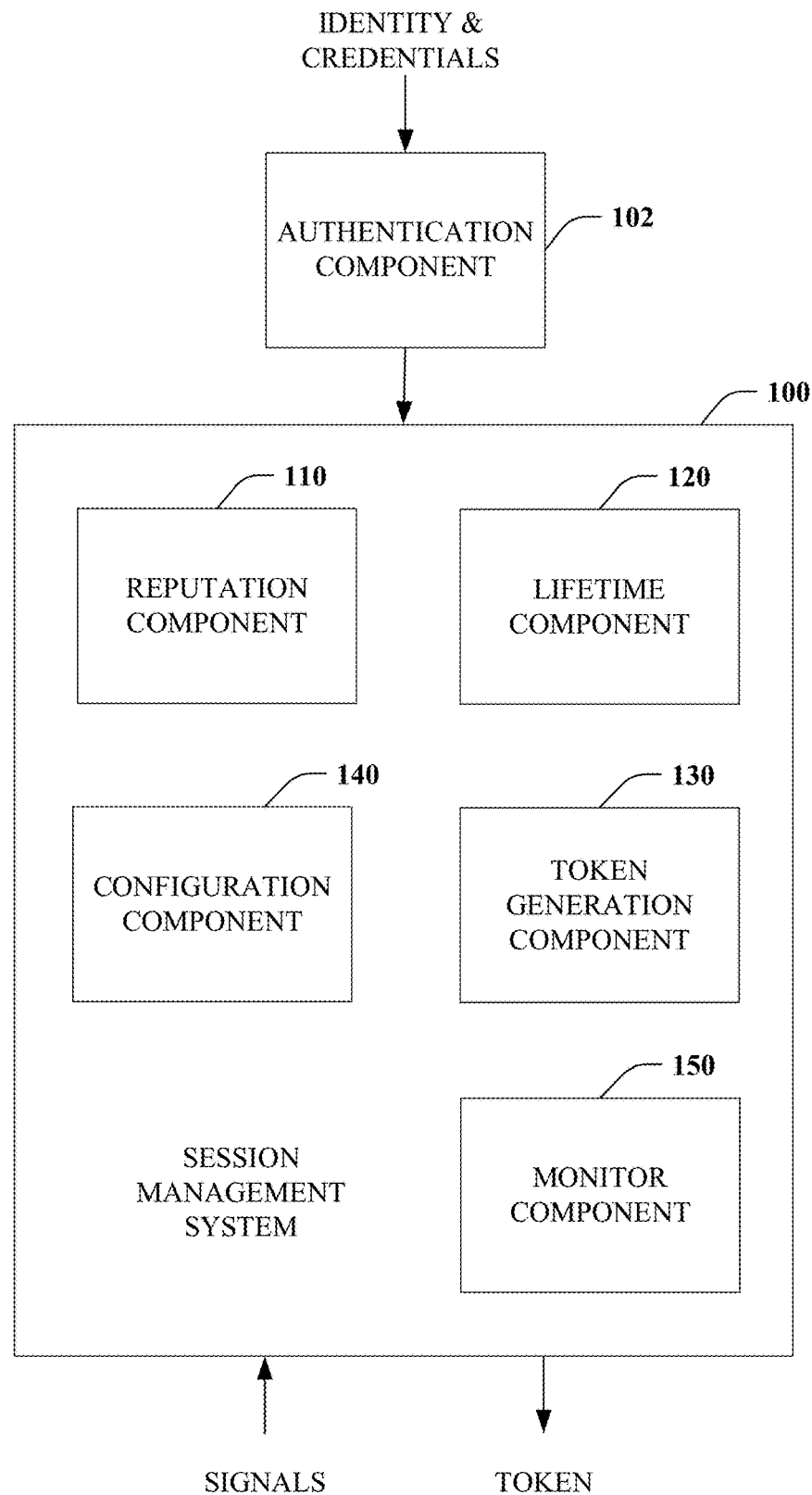
FIG. 1 is a schematic block diagram of a session management system.

Referring initially to FIG. 1, a session management system 100 is illustrated. Sessions are periods of time devoted to interactive information exchange between two or more communicating computers, or a user and a computer (e.g., login session). A session is established at a certain time and terminates later. This time span is referred to herein as session lifetime, or simply lifetime. The session management system 100 automatically determines and sets session lifetime in a manner that balances security and usability concerns, as described further hereinafter. The session management system 100 includes reputation component 110, lifetime component 120, token generation component 130, configuration component 140, and monitor component 150. The session management component receives input from authentication component 102 as well as signs indicative of various factors that can be employed to decide session lifetime. A token can be output that identifies a session and is valid for a lifespan determined by the session management system 100.

The authentication component 102 requests and receives an identity and one or more authentication credentials from an entity, such as a user or computer. The authentication component 102 seeks to verify the provided identity based on the one or more authentication credentials. More specifically, if the authentication credentials match the identity provided by an entity, the entity is authenticated. In other words, the entity is deemed to be who the entity claims. Authentication credentials can include something the entity knows, has, is, or does. For example, a user can provide a user name (e.g. identity) and password (e.g., credential). After an entity is authenticated by the authentication component 102, the session management system 100 is engaged.

Figure 2:
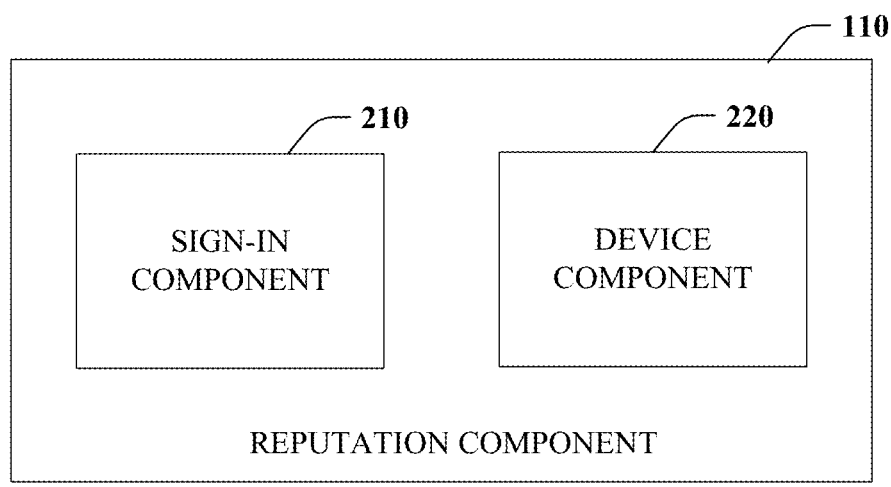
FIG. 2 is a schematic block diagram of a reputation component.

The reputation component 110 is configured to determine or infer session reputation. Session reputation is a measure of risk or safeness of a session based on one or more factors. Turning attention to FIG. 2, the reputation component 110 is illustrated in further detail including sign-in component 210 and device component 220.

The sign-in component 210 is configured to determine the risk or safeness of a session based on sign-in. Sign-in refers to authenticating for a session. Signals that can be collected and employed by the sign-in component include the authentication strength and authentication pattern. Authentication strength can correspond to a single-factor authentication, multi-factor authentication, and biometric authentication with single-factor authentication the weakest and biometric authentication the strongest. Authentication patterns can include direct authentication when a client and service share a trust relationship or broker authentication when a client and service do not share a trust relationship and thus use a third party for authentication. These patterns can also be weighted in terms of risk or safeness. Authentication strength and pattern are merely two exemplary factors that can be considered. Other sign-in factors or signals can also be considered. By way of example, and not limitation, sign-in location can also be a factor. For instance, consideration can be given to whether the sign-in is within a country or outside the country.

The device component 220 is a mechanism for determining the risk or safeness of a session based on computing device characteristics. For example, device risk can be calculated by collecting signals on device configuration, location, security capabilities, security health, and shared state. Device configuration can include whether the device is managed or not, among other things. Location can correspond to network or geographical location, some of which are riskier than others. For example, a location on a corporate network would be safer and less risky than a public or home network. Available security feature capabilities are also significant in terms of computing risk. By way of example, and not limitation, a device that is capable of token binding, which cryptographically binds tokens to mitigate token theft and replay attacks, is safer than a device without this capability. Security health can refer to the presence or absence of malware or viruses as determined by an anti-malware or virus program, wherein presence of malware or a virus is riskier than the absence thereof. Shared state concerns state being shared amongst multiple entities such as at a kiosk, wherein shared state is more of a security risk than independent state.

Returning to FIG. 1, the reputation component 110 can consider any factor related to the risk or secureness of a session. For example, in addition to sign-in and device risk, the reputation component 110 can consider sensitivity of a resource, role of user (e.g., employee, CEO . . . ), and device compliance, for instance as defined by an administrator. As another example, time of day can be considered such that sessions sought around midnight are riskier than those from 9 a.m. to 5 p.m. After all factors are considered, a reputation measure quantifying risk or secureness, such as a score or rank, can be computed and made available to the lifetime component 120.

The lifetime component 120 is configured to determine a lifetime for a session based on the session reputation as determined by the reputation component 110. Lifetime is the time span between session establishment and termination. Session reputation provides a measurement of session security risk or safeness based on a variety of factors. If the session reputation is risky, as determined by the session reputation exceeding a threshold, the lifetime will be shorter than if the session reputation was safe. For example, a risky session reputation may result in a lifetime of thirty minutes or no time at all, while a safe session reputation may produce a lifetime of ninety days or longer. Session reputations in between the risky and safe can acquire a lifetime between the two corresponding session risk or safeness. In one implementation, the session lifetime can be determined based on a mapping between session reputation scores and lifetimes.

The token generation component 130 generates a token associated with a session. The token can be a piece of data that includes an identifier as well as a lifetime, wherein the lifetime is that which is determined by the lifetime component 120. In accordance with one embodiment, the token can be a session token, or refresh token. This is distinct from an access token that provides access to a specific resource and is typically short lived. In fact, when an access token expires, a session token can be utilized to automatically issue a new access token. In accordance with one aspect of the subject disclosure, at the time when an access token requests use of the session token to acquire a new access token, session lifetime can be re-evaluated as described in further detail hereinafter.

The configuration component 140 is a mechanism that enables configuration of the session management system 100. The configuration component 140 can allow specification of a policy that states how the session management system 100 should operate, if employed at all. Further, the configuration component 140 can specify device configurations it requires or considers safe or risky. For example, a device may need to be managed and include installation of particular security software or features (e.g., token binding, Bit locker . . . ) to be compliant. Resource sensitivity can be specified and considered in determining session reputation. For instance, an administrator can note that a resource that controls an electrical grid for an electric company is sensitive. Further yet, user roles and impact can be specified and considered in reputation determination. For example, a chief executive officer or chief technology officer can have access to more sensitive resources than other employees and thus a security breach with respect to an officer's session can have a large impact. In context with sensitivity, it can be specified that some email could be sensitive because the person is the chief executive officer, while other email is not sensitive. Furthermore, configuration can be specified with a user interface.

Figure 3:
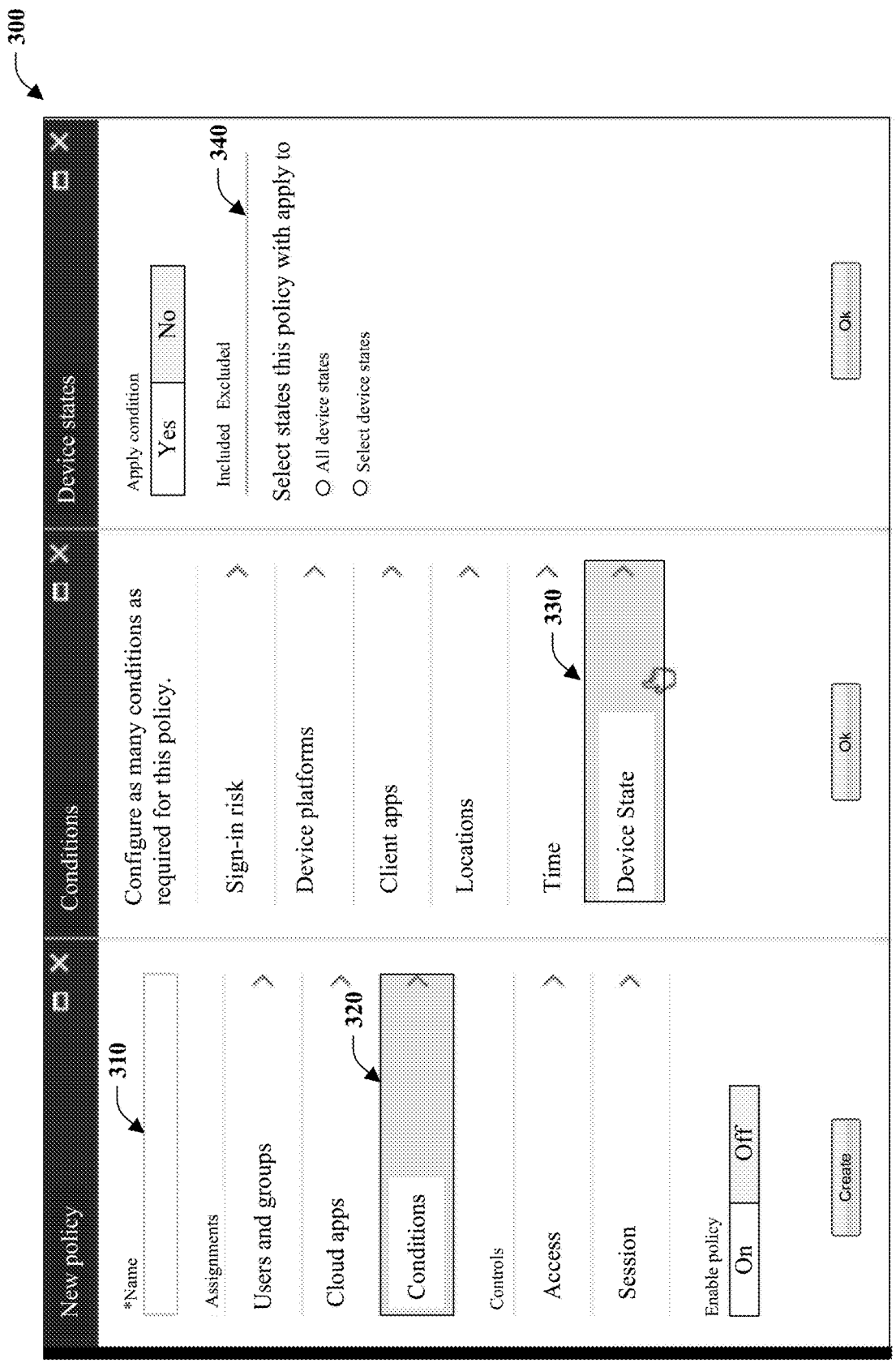
FIG. 3 is a screenshot of a manner of specifying conditions.
Figure 4:
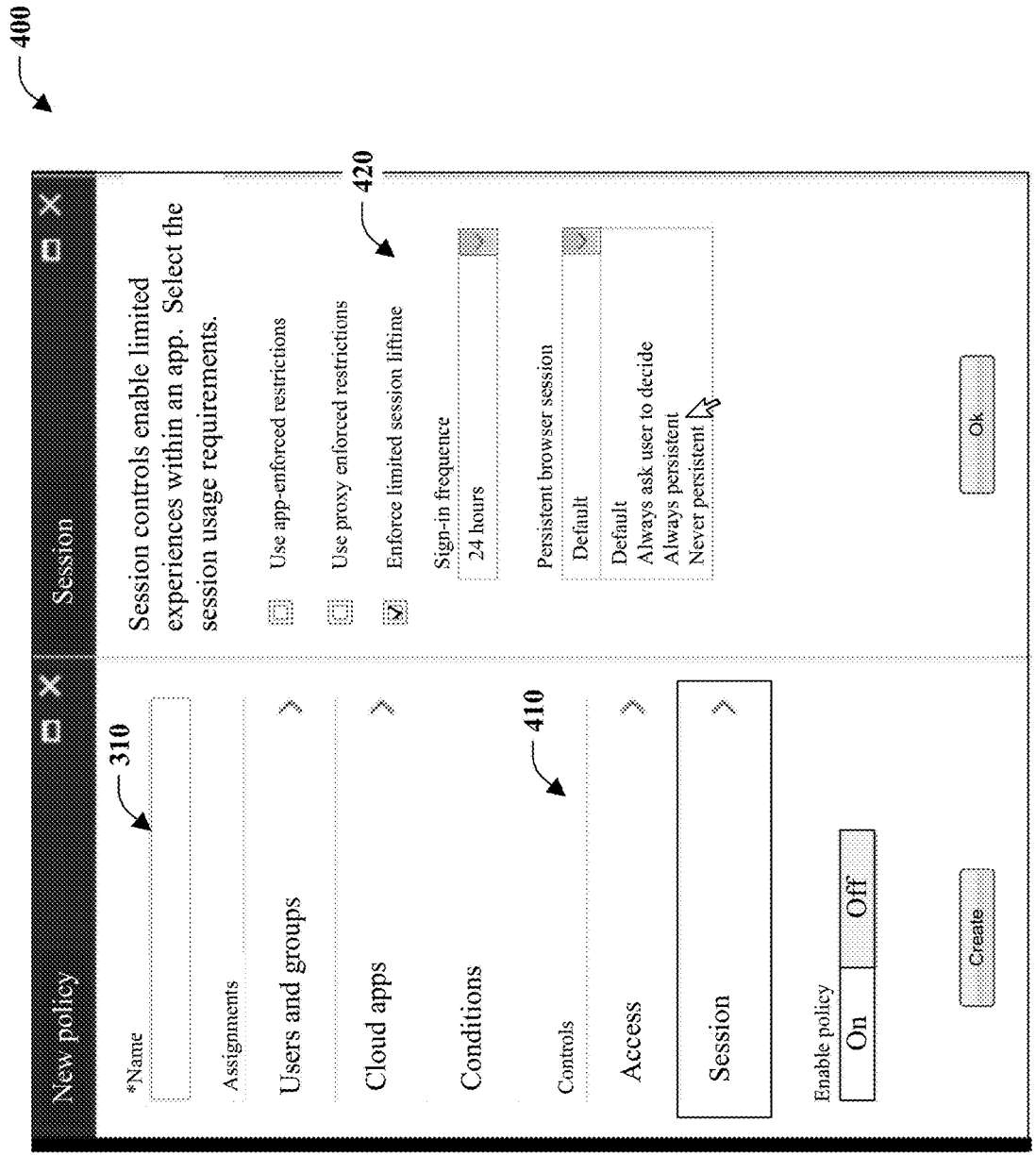
FIG. 4 is a screenshot of a manner of enabling session lifetime enforcement.

Turning attention to FIGS. 3 and 4, two exemplary screenshots are illustrated that can be associated with configuring session management. These screenshots are not meant to be comprehensive or limiting in anyway but rather depict one manner in which configuration can be performed. As shown in FIG. 3, screenshot 300 includes a text box 310 to enter a name of a new configuration policy to be defined. As depicted, text indicating conditions 320 is selected which can launch another panel from which various types of conditions can be configured. Here, device state 330 is selected which results in spawning of a device state panel in which buttons 340 are provided to indicate whether the policy applies to all device states or select device states. Turning attention to FIG. 4, screenshot 400 provides the text box 310 for specifying a name for the policy. Further, selection can be made as to what the policy is to apply to or control at 410, wherein session is selected. Selection of session can trigger spawning of a session panel where, at 420, enforcement of a limited session lifetime can be selected, and a default sign-in frequency of twenty-four hours specified.

Returning to FIG. 1, the monitor component 150 is configured to monitor actions and behavior and trigger or delay triggering of re-evaluation of a session lifetime. For instance, if an issued session token is requested for use in acquiring a new access token, re-evaluation can be initiated. At this point, if reputation can be determined, any differences from when reputation was previously computed can be reflected in the lifetime and a new session token issued with that lifetime. Other actions can also trigger re-evaluation. For example, if an account is disabled or the password is changed such that the session is no longer valid, re-authentication as well as re-evaluation of lifetime will be triggered. Behavior can also be analyzed and utilized as a basis of re-authentication and/or re-evaluation of session lifetime. For instance, if presence change, or lack of change can be determined by some means, such a determination can be utilized to trigger or defer triggering of re-authentication and/or re-evaluation. For example, if a device is able to continuously determine whether or not a user is present based on facial recognition, voice recognition, typing speed, or presence of a phone in close proximity, among other things, re-authentication and re-evaluation need not be activated. In fact, such signals may allow session lifetime to be extended as a function of a sort of natural authentication.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

By way of example, and not limitation, the session management system 100 can utilize a machine learning mechanism to determine session reputation. For instance, supervised learning can be employed, wherein sessions are labeled with a grade indicative of risk or safeness. Signals can also be received from other sources, such as an email program when the email program detects that a session was used to send spam. Of course, unsupervised learning could also be employed. Once the model is built and trained it can be utilized to infer session reputation which can then be mapped to a particular lifetime. Overtime, the model can become more intelligent and better able to determine session reputation and by implication session lifetime.

Figure 5:
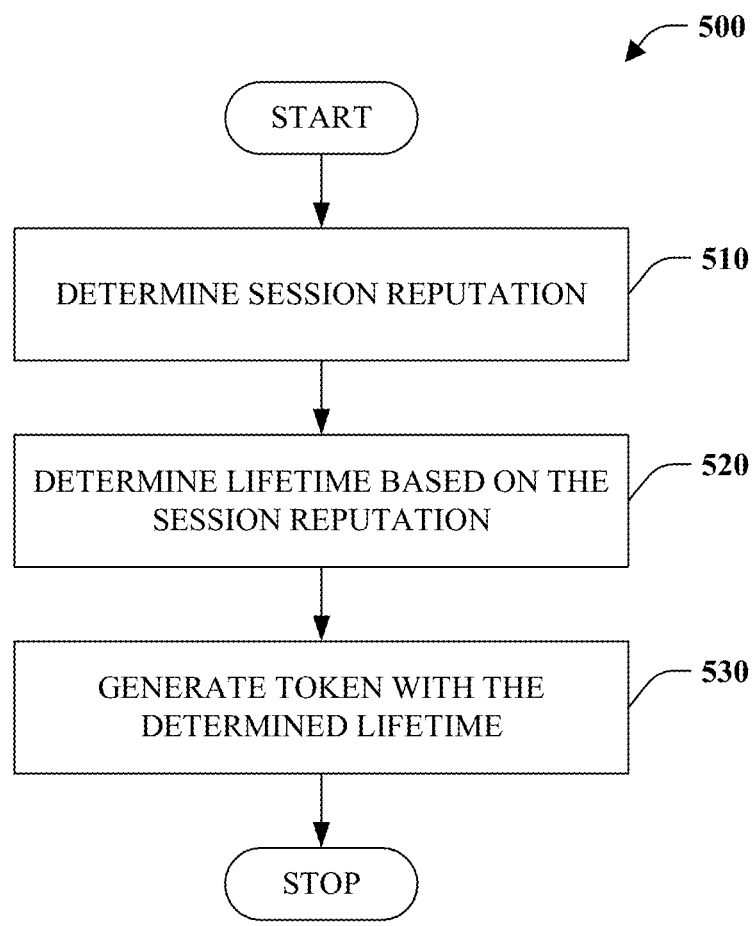
FIG. 5 is a flow chart diagram of a method of session generation.
Figure 6:
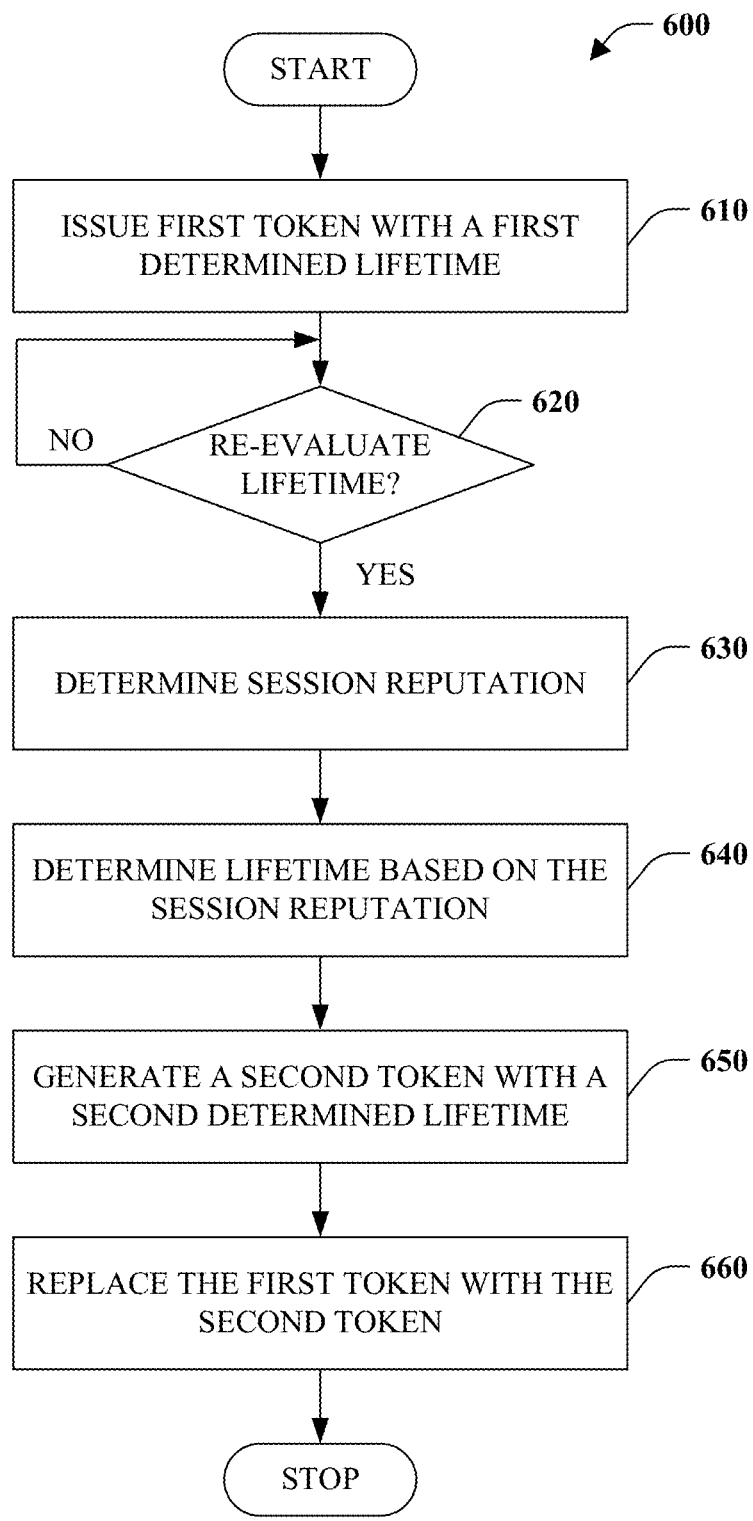
FIG. 6 is a flow chart diagram of a method of re-evaluating a session.
Figure 7:
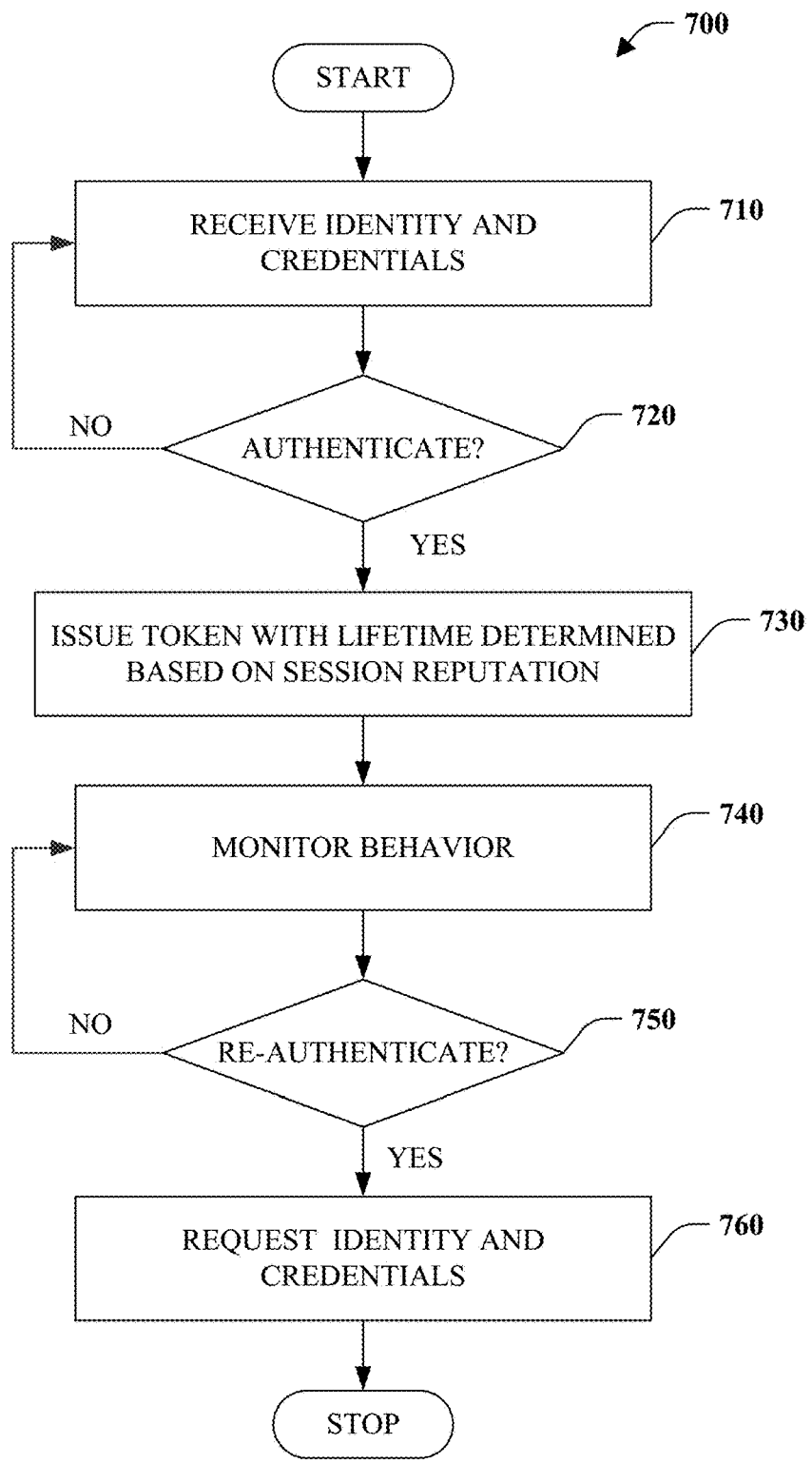
FIG. 7 is a flow chart diagram of an authentication method.

In view of the exemplary systems described above, methods that may be implemented in accordance with the disclosed subject matter will be better appreciated with reference to the flow charts of FIG. 5-7. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 5 illustrates a method of session generation 500, which can be performed by the session management system 100. At reference numeral 510, session reputation can be determined or inferred based on a variety of factors. For instance, signals can be provided from one or more sources regarding, among other things, authentication strength, device configuration, location, security capabilities, and security health, resource sensitivity, and sensitivity of a user requesting access. Based on the factors, a session reputation measurement or rank is determined. In one instance, machine learning can be employed to determine session reputation based on learned weights associated with each factor. At numeral 520, a lifetime is determined based on the session reputation. For example, a session reputation measurement can be mapped to a lifetime based on the value of the measurement. Session reputation measurements indicative of risk will be mapped to shorter lifetimes while measurements indicative of safety will be mapped to longer lifetimes. At reference numeral 530, a token is generated. The token can be a piece of data comprising a session identifier and a lifetime as previously determined based on session reputation. The token can subsequently be employed in connection with establishing a session comprising a series of related message exchanges between computers or a user and a computer.

FIG. 6 is a flow chart diagram of a method of session re-evaluation 600. At reference numeral 610, a first token is issued with a first lifetime or period of validity. At reference numeral 620, a determination is made as to whether or not the first lifetime should be re-evaluated. In one instance, re-evaluation can be at predetermined times, or in other words, periodically. In another instance, re-evaluation can be triggered. By way of example, and not limitation, the trigger can be utilization of a session token to acquire a new access token. After an access token expires, a session token can be sent as part of a request for a new access token. Prior to sending the session token in this context, re-evaluation can be triggered. If it is determined at 620 that re-evaluation is not required ("NO"), the method loops and continues to check. By contrast, if it is determined at numeral 620 that lifetime should be re-evaluated ("YES"), the method continues at numeral 630. At numeral 630, session reputation is determined. As previously described, a session reputation rank or score can be computed based on one or more factors including, but not limited to, authentication strength, device configuration, location, security capabilities, and security health, resource sensitivity, and sensitivity of a user requesting access. At reference numeral 640, a second lifetime is determined based on the session reputation. In accordance with one embodiment, this can be accomplished by consulting a mapping of session reputation score to a lifetime, wherein risky session reputations are mapped to shorter lifetimes than safe session reputation. At numeral 650, a second token is generated with the second determined lifetime. The first token is subsequently replaced with the second token at reference numeral 660. In the context of acquisition of a new access token, the second token can be submitted.

FIG. 7 depicts an authentication method 700. At reference numeral 710, an identity and one or more credentials are received from an entity such as a user or computer. At numeral 720, a determination is made as to whether or not to authenticate the entity based on the identity and one or more credentials. The determination can be made by verifying whether or not the credentials match the identity. If at 720 it is determined that the entity is not authenticated ("NO"), the method loops back to numeral 720 where different identity and credentials are received. However, if at 720, it is determined that the entity is authenticated ("YES"), the method proceeds to numeral 730. At numeral 730, a token is issued with a lifetime determined based on session reputation. More specifically, a session reputation score or rank can be computed based on a number of factors such as authentication strength and device security capabilities, and a lifetime is determined from a mapping between session reputation score and lifetime. At numeral 740, behavior of an entity is monitored (subject to granted permission). For example, if the entity is a user, a camera of a user device can be employed to continue to monitor for the presence of the user using facial recognition. Additionally or alternatively, proximity of a user's mobile phone can be monitored or typing speed analyzed, among other things. At reference numeral 750, a determination is made as to whether or not to require re-authentication. The determination can consider the lifetime of the token as well as the monitored behavior. If the token is still valid by virtue of its lifetime not expiring, re-authentication could still be required if the user is determined to not be present for a predetermined time based on monitored behavior. Alternatively, even if the token has recently expired, re-authentication may not be required if monitored behavior indicates that the user is still present. In this case, the behavior monitoring acts as a sort of natural authentication that can extend the lifetime of a current token or cause a new token to be issued. If at numeral 750 re-authentication is not required ("NO"), the method continues at 740 where behavior monitoring continues. If at numeral 750 re-authentication is desired, the method proceeds to numeral 760, where identity and credentials are requested for purposes of re-authentication.

Description regarding adaptive session lifetime has focused on determining and setting an appropriate session lifetime initially, which can be modified or revoked at a later time. However, session lifetime can initially be set to a predetermined or random value or be infinite. Later, the session lifetime can be set to a more targeted value based on session reputation or merely monitored and revoked based on changed circumstances.

There are various use cases that can employ aspects of the subject disclosure. In one instance, an administrator for an organization desires to ensure security of the organization's data while not irritating organization personnel by over prompting for authentication identity and credentials. The administrator can accomplish this be using adaptive session lifetimes. Further, the administrator can understand that different resources have different levels of sensitivity. Accordingly, stricter session lifetime policies can be specified for more sensitive resources, and more lax policies for less sensitive resources. In this manner, the administrator has control to implement the right level of security and usability.

Aspects of the subject disclosure pertain to the technical problem of security regarding access to computer resources. The technical feature associated with addressing this problem is adaptive session lifetime. Session lifetime can vary for each user computing device based on sign-in risk, device risk, data sensitivity, and role, among other things, such that security is maintained without over prompting for credentials to prove identity. Further, lifetimes can be altered or revoked dynamically based on changed conditions. Furthermore, processing can be automatic with machine learning becoming more intelligent and adaptive over time.

The subject disclosure supports various products and processes that perform, or are configured to perform, various actions regarding session management. What follows are one or more exemplary systems and methods.

A system of session management, comprising: a processor coupled to a memory, the processor configured to execute computer-executable instructions stored in the memory that when executed cause the processor to perform the following actions: computing session reputation automatically based on sign-in risk and device risk; determining session lifetime based on the session reputation, wherein session lifetime is a length of validity; generating a token that identifies a session and include session lifetime; and returning the token in response to successful authentication of an entity. The session reputation can further be determined based on on a signal that indicates compliance with a predetermined device configuration, a signal that indicates sensitivity of a resource for which access is requested, a signal that indicates a role of the entity with respect to access to sensitive data, a signal that indicates device health in terms of presence or absence of malware or virus, a signal that indicates device security capability, or a signal that indicates authentication strength. The system further comprising employing machine learning in computing the session reputation. The system further comprising revoking validity of the token prior to the length of the lifetime.

A method of session management, comprising: employing at least one processor configured to execute computer-executable instructions stored in a memory that when executed cause the at least one processor to perform the following acts: computing session reputation automatically based on sign-in risk and device risk; determining session lifetime based on the session reputation, wherein session lifetime is a length of validity; generating a token that identifies a session and is valid for the for the lifetime; and returning the token in response to successful authentication of an entity. The method further comprises determining session reputation based on sensitivity of a resource for which access is requested or a role of a user requesting access. The method comprising determining sign-in risk based on at least one of authentication strength or authentication pattern. The method further comprising determining device risk based one at least one of device health, in terms of presence or absence of malware or virus, security capabilities, or compliance with specified configurations. The method further comprising revoking validity of the token prior to expiration of the lifetime based on a recomputed and different session reputation. The method further comprising employing machine learning to automatically compute session reputation and determine session lifetime based on the session reputation.

A system of session management, comprising: a means for determining session reputation based on sign-in risk and device risk; a means for determining a session lifetime based on the session reputation, wherein the session lifetime is a length of validity; and a means for generating a token that identifies a session and is valid for the session lifetime. The system further comprising a means for determining the session lifetime based on sensitivity of a resource for which access is requested. The system further comprising a means for determining device risk based on signals regarding one or more of configuration, location, security capabilities, or health. The system further comprising a means for determining sign-in risk based on signals regarding one or more of authentication strength or authentication pattern.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 8:
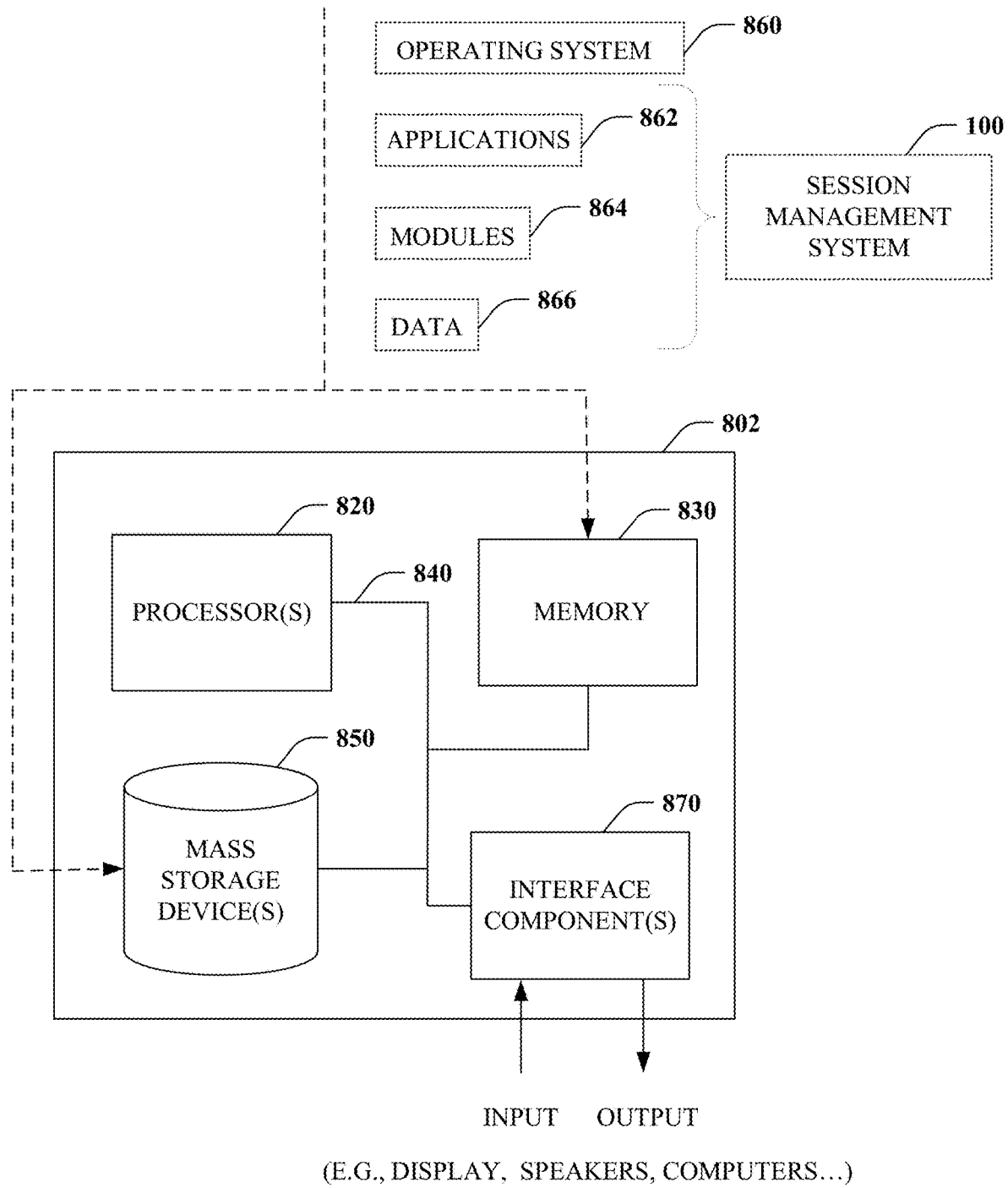
FIG. 8 is a schematic block diagram illustrating a suitable operating environment for aspects of the subject disclosure.

In order to provide a context for the disclosed subject matter, FIG. 8 as well as the following discussion are intended to provide a brief, general description of a suitable environment in which various aspects of the disclosed subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 8, illustrated is an example general-purpose computer or computing device 802 (e.g., desktop, laptop, tablet, watch, server, hand-held, programmable consumer or industrial electronics, set-top box, game system, compute node . . . ). The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830.

The processor(s) 820 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the disclosed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory . . . ) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage device(s) 850 to perform one or more actions. Accordingly, applications 862 can turn a general-purpose computer 802 into a specialized machine in accordance with the logic provided thereby.

All or portions of the disclosed subject matter can be implemented using standard programming and/or engineering techniques to produce software, firmware, hardware, or any combination thereof to control a computer to realize the disclosed functionality. By way of example and not limitation, the session management system 100, or portions thereof, can be, or form part, of an application 862, and include one or more modules 864 and data 866 stored in memory and/or mass storage device(s) 850 whose functionality can be realized when executed by one or more processor(s) 820.

In accordance with one particular embodiment, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the session management system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g. serial, parallel, PCMCIA, USB, FireWire . . . ) or an interface card (e.g., sound, video . . . ) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 870 can be embodied as an output peripheral interface to supply output to displays (e.g., LCD, LED, plasma, organic light-emitting diode display (OLED) . . . ), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system of session management, said system comprising:
   one or more processors; and
   one or more hardware storage devices that store instructions that are executable by the one or more processors to cause the system to at least:
      set one or more conditions that are to be considered in determining a session reputation for each session, the one or more conditions being associated with at least one of (1) sign-in risk, (2) device risk, (3) client applications that are running on a device, (4) a location of a device, (5) time of sign-in, or (6) device state;
      in response to a sign-in with a successful authentication of a user,
         generate a token that identifies a session that corresponds to the successful authentication of the user and that is valid for a lifetime of the session;
         compute a session reputation for the session, wherein the session reputation is automatically computed based on the one or more conditions;

determine a new session lifetime based on the session reputation, wherein the new session lifetime is a new length of validity for the session;
cause the token to be valid for the new session lifetime;
cause a behavior of the user to be monitored during the session, wherein monitoring behavior of the user includes at least one of: (i) employing a camera to monitor for a presence of the user or (ii) monitoring a proximity of a mobile device of the user;
determine the new session lifetime of the session is expired or will expire within an upcoming time period;
determine the user is still present based on monitored behavior of the user; and
based on determining the user is still present, determine the user is naturally authenticated and extend the new session lifetime of the session to enable the user to continue with the session.

2. The system of claim 1, wherein the system is further configured to at least:
determine the session reputation automatically based on a signal that indicates compliance with a predetermined device configuration.

3. The system of claim 1, wherein the system is further configured to at least:
determine the session reputation based on a signal that indicates sensitivity of a resource for which access is requested.

4. The system of claim 1, wherein the system is further configured to at least:
determine the session reputation based on a signal that indicates a role of the user with respect to access to sensitive data.

5. The system of claim 1, wherein the system is further configured to at least:
determine a device risk based on a signal that indicates device health in terms of presence or absence of malware or virus.

6. The system of claim 1, wherein the system is further configured to at least:
determine a device risk based on a signal that indicates device security capability.

7. The system of claim 1, wherein the system is further configured to at least:
determine the sign-in risk based on a signal that indicates authentication strength.

8. The system of claim 1, wherein the system is further configured to at least:
employ machine learning in computing the session reputation.

9. The system of claim 1, wherein the system is further configured to at least:
revoke validity of the token prior to an ending of the new session lifetime.

10. A method of session management, said method comprising:
employing at least one processor configured to execute computer-executable instructions stored in a memory that when executed cause the at least one processor to perform at least:
setting one or more conditions that are to be considered in determining a session reputation for each session, the one or more conditions being associated with at least one of (1) sign-in risk, (2) device risk, (3) client applications that are running on a device, (4) a location of a device, (5) time of sign-in, or (6) device state;
in response to a sign-in with a successful authentication of a user,
generating a token that identifies a session that corresponds to the successful authentication of the user and that is valid for a lifetime of the session;
computing a session reputation for the session, wherein the session reputation is automatically computed based on a the one or more conditions;
determining a new session lifetime based on the session reputation, wherein the new session lifetime is a new length of validity for the session;
causing the token to be valid for the new session lifetime;
causing a behavior of the user to be monitored during the session, wherein monitoring behavior of the user includes at least one of: (i) employing a camera to monitor for a presence of the user or (ii) monitoring a proximity of a mobile device of the user;
determining the new session lifetime of the session is expired or will expire within an upcoming time period;
determining the user is still present based on monitored behavior of the user; and
based on determining the user is still present, determining the user is naturally authenticated and extend the new session lifetime of the session to enable the user to continue with the session.

11. The method of claim 10 further comprising determining the session reputation based on sensitivity of a resource for which access is requested.

12. The method of claim 10 further comprising determining the session reputation based on a role of the user requesting access.

13. The method of claim 10 further comprising determining the sign-in risk based on at least one of an authentication strength or an authentication pattern.

14. The method of claim 10 further comprising determining a device risk based one at least one of a device health, in terms of a presence or an absence of malware or virus, security capabilities, or compliance with specified configurations.

15. The method of claim 10 further comprising revoking validity of the token prior to expiration of the new session lifetime based on a recomputed and different session reputation.

16. The method of claim 10 further comprising employing machine learning to automatically compute the session reputation and to determine the new session lifetime based on the session reputation.

17. A system of session management, said system comprising:
means for setting one or more conditions that are to be considered in determining a session reputation for each session, the one or more conditions being associated with at least one of (1) sign-in risk, (2) device risk, (3) client applications that are running on a device, (4) a location of a device, (5) time of sign-in, or (6) device state;
means for generating a token that identifies a session that corresponds to a successful authentication of a user and that is valid for a lifetime of the session in response to a sign-in with the successful authentication of the user;

means for determining a session reputation based on the one or more conditions;

means for determining a new session lifetime based on the session reputation, wherein the new session lifetime is a new length of validity for the session;

means for causing the token to be valid for the new session lifetime;

means for causing a behavior of the user to be monitored during the session, wherein monitoring behavior of the user includes at least one of: (i) employing a camera to monitor for a presence of the user or (ii) monitoring a proximity of a mobile device of the user;

means for determining the new session lifetime of the session is expired or will expire within an upcoming time period;

means for determining the user is still present based on monitored behavior of the user; and based on determining the user is still present, means for determining the user is naturally authenticated and extend the new session lifetime of the session to enable the user to continue with the session.

18. The system of claim 17 further comprising a means for determining the new session lifetime based on sensitivity of a resource for which access is requested.

19. The system of claim 17 further comprising a means for determining a device risk based on signals regarding one or more of configuration, location, security capabilities, or health.

20. The system of claim 17 further comprising a means for determining the sign-in risk based on signals regarding one or more of authentication strength or authentication pattern.

* * * * *